(12) United States Patent
Vivanco (10) Patent No.: US 9,246,817 B1
(45) Date of Patent: Jan. 26, 2016

(54) SYSTEM AND METHOD OF MANAGING TRAFFIC FLOW IN A COMMUNICATION NETWORK

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 164 days.

(21) Appl. No.: 13/761,105

(22) Filed: Feb. 6, 2013

(51) Int. Cl.
*H04J 3/14* (2006.01)
*H04W 24/02* (2009.01)
*H04L 12/801* (2013.01)

(52) U.S. Cl.
CPC ...................................... *H04L 47/12* (2013.01)

(58) Field of Classification Search
USPC .......................... 370/221, 235, 252, 335, 342
See application file for complete search history.

(56) References Cited

U.S. PATENT DOCUMENTS

| | | | | |
|---|---|---|---|---|
| 5,841,778 | A * | 11/1998 | Shaffer et al. | 370/447 |
| 7,088,678 | B1 * | 8/2006 | Freed et al. | 370/230 |
| 7,263,067 | B2 * | 8/2007 | Sreemanthula et al. | 370/236 |
| 7,860,007 | B2 | 12/2010 | Singh et al. | |
| 2003/0035385 | A1 * | 2/2003 | Walsh et al. | 370/316 |
| 2008/0062876 | A1 * | 3/2008 | Giroux et al. | 370/235 |

\* cited by examiner

*Primary Examiner* — Edan Orgad
*Assistant Examiner* — Sithu Ko (57) ABSTRACT

A system and method of managing traffic flow in a communication network is provided. Messages transmitted in the communication network can be monitored. A traffic flow profile for each message can be determined based on a lifetime classification type and a congestion control mechanism mode for each traffic flow profile can be determined. Traffic flow transmission can be modified in the communication network using a data flow mechanism where a data flow mechanism variable is modified based on the traffic flow profile and the congestion control mechanism mode.

19 Claims, 5 Drawing Sheets

SYSTEM AND METHOD OF MANAGING TRAFFIC FLOW IN A COMMUNICATION NETWORK

TECHNICAL BACKGROUND

In computer networks, such as the Internet, information can be transmitted using Transmission Control Protocol (TCP) and Internet Protocol (IP). TCP/IP protocols provide end-to-end communications throughout the network for data message traffic flows. The size of a traffic flow can influence network performance. In a wireless network, a large number of simultaneous short-lived TCP flows can deteriorate network performance. Packet loss associated with short-lived TCP flows can cause excessive packet retransmission which reduces radio resources.

OVERVIEW

Systems and methods of managing traffic flow in a communication network are provided. Messages transmitted in the communication network can be monitored. A traffic flow profile for each message can be determined based on a lifetime classification type and a congestion control mechanism mode for each traffic flow profile can be determined. Traffic flow transmission can be modified in the communication network using a data flow mechanism where a data flow mechanism variable is modified based on the traffic flow profile and the congestion control mechanism mode.

DETAILED DESCRIPTION

Figure 1:
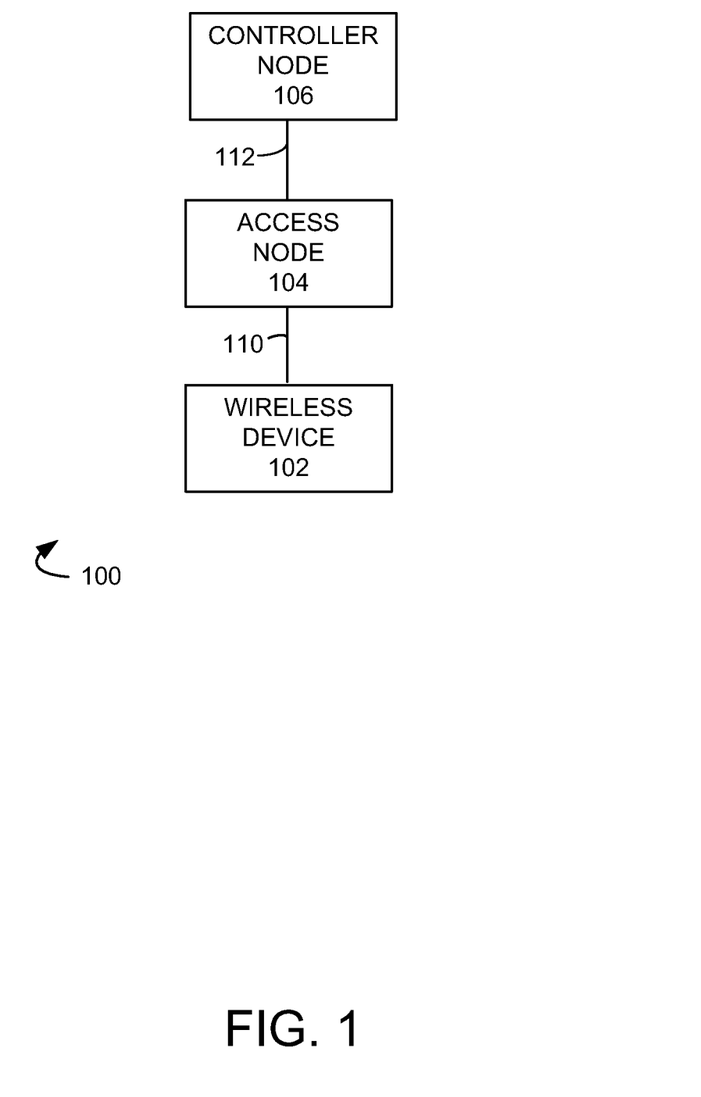
FIG. 1 illustrates an exemplary communication system to transmit traffic flows in a communication network.

FIG. 1 illustrates an exemplary communication system 100 for managing traffic flow in a communication network comprising a wireless device 102, an access node 104, and a controller node 106. Other network elements may be present in the communication system 100 to facilitate communication but are omitted for clarity, such as gateways, routers, mobile switching centers, and location registers such as a home location register or visitor location register.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof.

Wireless device 102 is in communication with access node 104 through communication link 110. Link 110 can use various communication media, such as air, space, metal, optical fiber, or some other signal propagation path—including combinations thereof. Communication link 110 may comprise many different signals sharing the same link. Communication link 110 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link 110, but be transferred over different communication sessions, frequencies, timeslots, packets, ports, sockets, logical transport links, or in different directions—including combinations thereof.

Access node 104 can be any network node configured to provide an interface between wireless device 102 and controller node 106. For example, access node 104 can be a base transceiver station, a radio base station, an eNodeB device, or an enhanced eNodeB device. Access node 104 can include various elements such as a transceiver, power amplifier, combiner, duplexer, antenna, and control function devices. The access node 104 can have various functions. For example, access node 104 can provide mobility management, hand off provisioning and control, radio resource management, quality of service enforcement, session management, as well as other functions.

Access node 104 is in communication with controller node 106 through communication link 112. Communication link 112 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Link 112 can be a direct link or might include various equipment, intermediate components, systems, and networks. Link 112 can include multiple signals operating in a single pathway in a similar manner as wireless link 110.

Although a single access node 104 is illustrated in FIG. 1, wireless device 102 can be in communication with more than one access node. The plurality of access nodes can be associated with different networks, for example, supporting different voice call protocols and/or different types of voice calls. For example, a first network can support packet switched telephone network calls and a second network can support voice over internet protocol (VoIP) calls. The plurality of access nodes can also comprise a variety of devices, for example, a first access node can be a base station of a wireless communication network, and a second access node can be a wired or wireless access point of a data network. Other examples and combinations are also possible.

Controller node 106 is a network element in communication with a communication network (not illustrated) and access node 104. Controller node 106 can be any element configured to communicate information over a network or control communication of the information over the network. Controller node 106 can be a standalone computing device, computing system, or network component, and can be accessible, for example, by a wired or wireless connection, or through an indirect connection such as through a computer network or communication network. For example, controller node 106 can include a mobility management entity (MME), a serving gateway (SGW), a public data network gateway (PGW), a Home Subscriber Server (HSS), a Policy Control and Charging Rules Function (PCRF), etc. One of ordinary skill in the art would recognize that controller node 106 is not limited to any specific technology architecture, such as Long Term Evolution (LTE) and can be used with any network architecture.

Controller node 106 can comprise a processor and associated circuitry to execute or direct the execution of computer-readable instructions to obtain information. Controller node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 106 can receive instructions and other input at a user interface.

Wireless device 102 can establish a communication session with controller node 106 via access node 104 to communicate information over a network using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

The information communicated over the network can be divided into packets and classified based on the lifetime of the data message flow. For example, lifetime classifications can include short-lived messages and long-lived messages. A short-lived message can include a minimum amount of data and have a short transmission duration, for example less than a minute. Examples of a short-lived message include data transmission related to internet web browsing. A long-lived message can include large data file having a longer transmission duration, for example a few minutes. Examples of a long-lived message include file transfer protocol (FTP) and Telnet.

A congestion control mechanism can be used during the transmission process. For example, a TCP congestion control window can be implemented to control transmission between wireless device 102 and controller node 106. The congestion control window can comprise a slow start mode, a congestion avoidance mode, and a constant rate mode. When the wireless device 102 begins to transmit or receive messages, the congestion state of the network is unknown and the congestion control mechanism begins transmitting in a slow start mode. During the slow start mode, one message segment size can be sent at a time. The message segment size can be a predetermined size defined by the network. If an acknowledgement message is received after the one message segment is sent, the congestion window size can be doubled such that two message segment sizes are sent.

For every acknowledgment message received, the congestion window size is doubled until a slow start threshold is reached. The slow start threshold can be the delineation between the slow start mode and the congestion avoidance mode of the congestion control mechanism. After the slow start threshold is reached, the size of the congestion window is increased until the maximum window size is reached. The maximum window size can be a predetermined size defined by the network. The maximum window size can be the delineation between the congestion avoidance mode of the congestion control mechanism and the constant rate mode. After the maximum window size is achieved, the transmit window size of the congestion window remains constant during the constant rate mode.

Short-lived traffic flows can carry a small amount of data but represent a large percentage of flow traffic. Spending most of their time in the slow start mode, the congestion control mechanism typically increases exponentially when transmitting short-lived flows. Long-lived traffic flows can start in the slow start mode of a congestion control mechanism, but spend most of their lifetime in the congestion avoidance phase.

In addition to the congestion control mechanism, a data flow mechanism can be implemented to dictate when traffic can be transmitted and/or received between the wireless device 102 to the network. For example, the data flow mechanism can be a token bucket algorithm. The token bucket algorithm can, among other things, allow delivery of messages to and/or from the wireless device 102. By the use of a token bucket algorithm, data traffic can be shaped dynamically so that a burst of data, such as a TCP traffic flow message, can be transmitted up to a determined burst rate. By analogy, a token bucket contains tokens, each of which can represent a unit of bytes or a single packet of predetermined size. The number of tokens determines the ability to send a packet, according to a predetermined token threshold, and the more tokens are in the bucket, the greater the permitted data burst, up to a peak data rate. The token bucket can be adjusted according to, among other things, the application requirements, the availability of carrier bands in a network, radio frequency (RF) environment conditions, available modulation and coding schemes, backhaul and/or network congestion, and an amount of data buffered in the access node and/or the aggregation router.

Variables of the data flow mechanism can be selected to modify the rate at which data is transmitted. For example, variables such as token rate (r), token size (a), and bucket size (b) can be modified in the data flow mechanism. When the token rate (r) is set to be small and the token size (a) is set to be large, data can be sent less frequently from the wireless device 102 such that a large amount of transmission resources are requested due to the large group of packets requested to be sent. When token rate (r) is set to be large and the token size (a) is set to be small, data can be sent more frequently from the wireless device 102 such that a small amount of transmission resources are requested due to the small group of packets requested to be sent. The bucket size (b) of the token algorithm can be indicative of the amount of RF resources available to the wireless device. In an embodiment, bucket size (b) can be set based on the traffic flow profile of the messages. For example, for short-lived messages the bucket size can be set such that packets are transmitted in small groups more frequently. For long-lived messages, the bucket size can be set such that packets are transmitted in large groups less frequently.

In operation, an element of communication system 100, such as access node 104 and/or controller node 106 can monitor messages communicated to and/or from wireless device 102 to determine a traffic flow profile of each message. The traffic flow profile can be based on a lifetime classification type, such as short-lived and long-lived. A congestion control mechanism, such as a control window, can be monitored to determine a congestion control mechanism mode. The congestion control mechanism mode can be associated with the traffic flow profile. Traffic flow transmission in the communication network can be modified using a data flow mechanism such as a token bucket algorithm. A variable of the data flow mechanism can be modified based on the traffic flow profile of each message and the congestion control mechanism. Higher priority can be given to short-lived messages over long-lived messages to allow short lived messages to be delivered faster thereby releasing radio bearers promptly and minimizing any delay perceived by a user.

Figure 2:
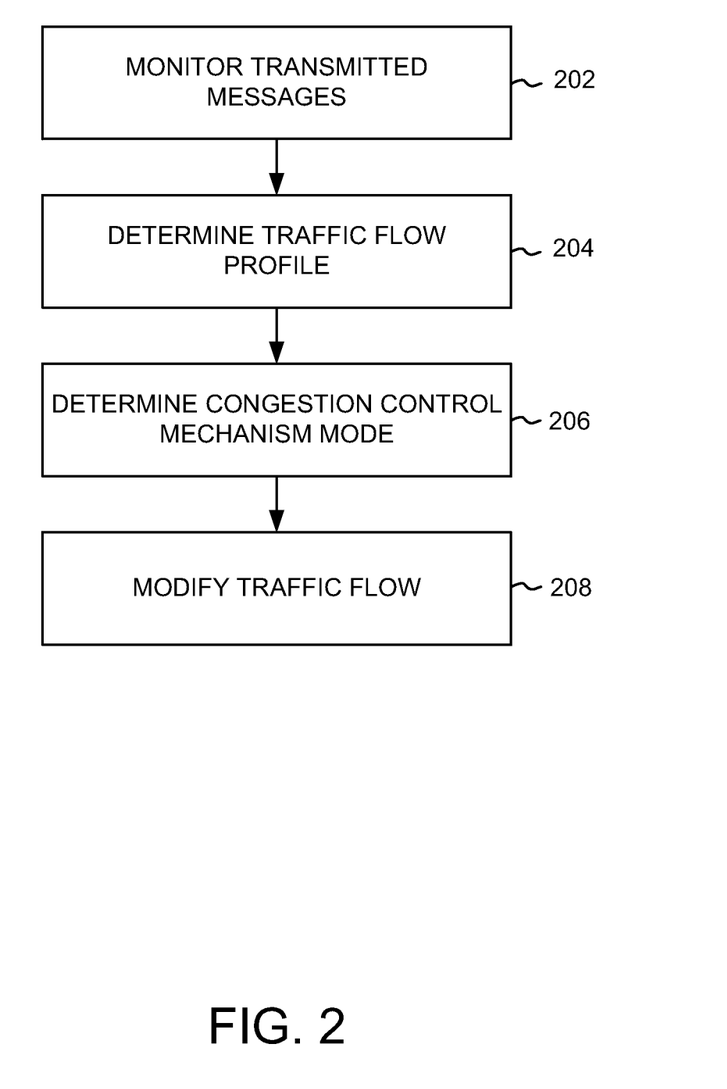
FIG. 2 illustrates an exemplary method of transmitting traffic flows in a communication network.

FIG. 2 illustrates an exemplary method of managing traffic flow in a communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A network node can monitor messages transmitted over the network at 202. For example, access node 104 and/or controller node 106 can monitor TCP message flow between the network and wireless device 102 in the uplink and/or downlink direction. At 204, a traffic flow profile can be determined for each transmitted message based on a lifetime classification type. For example, a message can be classified as a short-lived message or a long-lived message. Classification and profile determination can be performed by the access node 104 and/or the controller node 106.

A congestion control mechanism can be monitored to determine a congestion control mechanism mode at 206. For example, access node 104 and/or controller node 106 can monitor a congestion window to determine whether the congestion window is in a slow-start mode, a congestion avoidance mode, and/or a constant-rate mode.

Traffic flow transmission within a network can be modified using a data flow mechanism at 208. For example, a data flow mechanism, such as a token bucket algorithm, can be used to control transmission to and/or from wireless device 102. At least one variable of the data flow mechanism, such a token bucket size, can be modified based on a message traffic flow profile and the congestion control mechanism mode.

Figure 3:
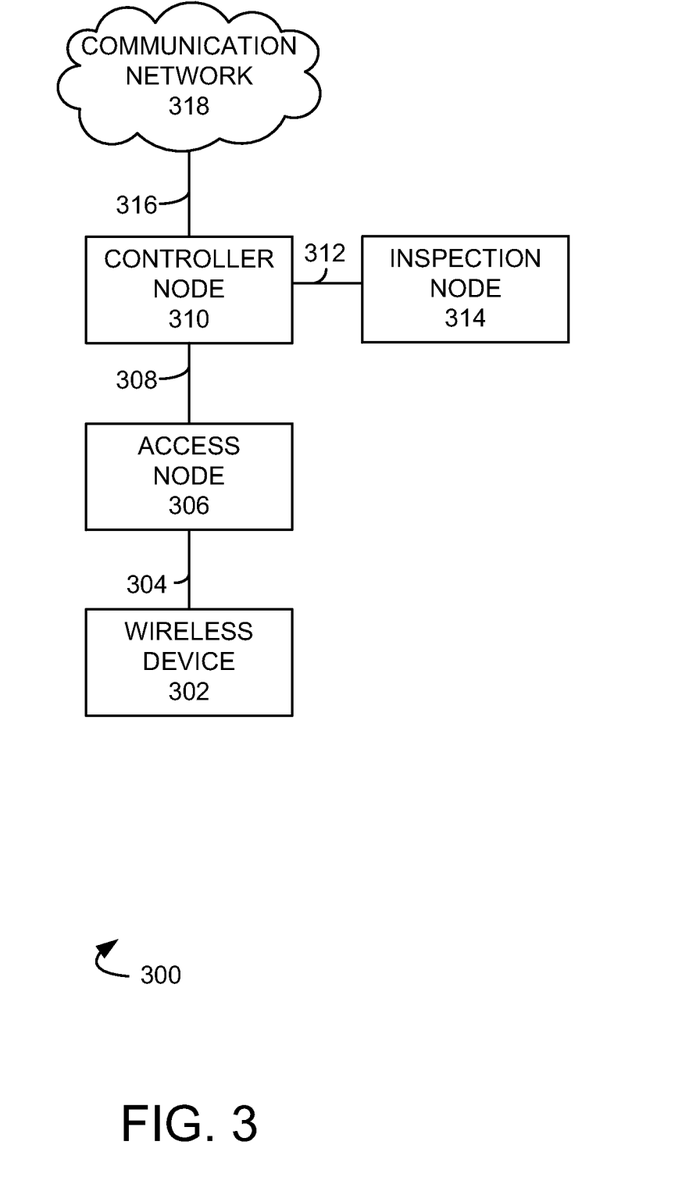
FIG. 3 illustrates another exemplary communication system to transmit traffic flows in a communication network.

FIG. 3 illustrates an exemplary communication system 300 for managing traffic flow in a communication network comprising a wireless device 302, an access node 306, a controller node 310, an inspection node 314, and a communication network 318. Other network elements may be present in the communication system 300 to facilitate communication but are omitted for clarity, such as gateways, routers, mobile switching centers, and location registers such as a home location register or visitor location register.

Wireless device 302 can be any device configured to communicate over communication system 300 using a wireless interface. For example, wireless device 302 can include a cell phone, a smart phone, a computing platform such as a laptop, palmtop, or a tablet, a personal digital assistant, or an internet access device, and combinations thereof.

Wireless device 302 is in communication with access node 306 through communication link 304. Link 304 can use various communication media, such as air, space, metal, optical fiber, or some other signal propagation path—including combinations thereof. Communication link 304 may comprise many different signals sharing the same link. Communication link 304 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 302 and access node 306 could share the same representative wireless link 304, but be transferred over different communication sessions, frequencies, timeslots, packets, ports, sockets, logical transport links, or in different directions—including combinations thereof.

Access node 306 can be any network node configured to provide an interface between wireless device 302 and controller node 310. For example, access node 306 can be a base transceiver station, a radio base station, an eNodeB device, or an enhanced eNodeB device. Access node 306 can include various elements such as a transceiver, power amplifier, combiner, duplexer, antenna, and control function devices. The access node 306 can have various functions. For example, access node 306 can provide mobility management, hand off provisioning and control, radio resource management, quality of service enforcement, session management, as well as other functions.

Access node 306 is in communication with controller node 310 through communication link 308. Controller node 310 is in communication with inspection node 314 through communication link 312 and in communication with communication network 318 through communication link 316. Communication links 308, 312, and 316 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Links 308, 312, and 316 can be a direct link or might include various equipment, intermediate components, systems, and networks. Links 308, 312, and 316 can include multiple signals operating in a single pathway in a similar manner as wireless link 304.

Although a single access node 306 is illustrated in FIG. 3, wireless device 302 can be in communication with more than one access node. The plurality of access nodes can be associated with different networks, for example, supporting different voice call protocols and/or different types of voice calls. For example, a first network can support packet switched telephone network calls and a second network can support voice over internet protocol (VoIP) calls. The plurality of access nodes can also comprise a variety of devices, for example, a first access node can be a base station of a wireless communication network, and a second access node can be a wired or wireless access point of a data network. Other examples and combinations are also possible.

Controller node 310 can be any element configured to communicate information over a network or control communication of the information over the network. Controller node 310 can be a standalone computing device, computing system, or network component, and can be accessible, for example, by a wired or wireless connection, or through an indirect connection such as through a computer network or communication network. For example, controller node 310 can include a mobility management entity (MME), a serving gateway (SGW), a public data network gateway (PGW), a Home Subscriber Server (HSS), a Policy Control and Charging Rules Function (PCRF), etc. One of ordinary skill in the art would recognize that controller node 310 is not limited to any specific technology architecture, such as Long Term Evolution (LTE) and can be used with any network architecture.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 310 can receive instructions and other input at a user interface.

Inspection node 314 can be a network node configured to inspect various properties associated with the network. For example, inspection node 314 can, among other things, perform deep packet inspection of packets sent from and/or to wireless device 302. Deep packet inspection generally involves an inspection of packets beyond Open Systems Interconnection (OSI) layer 3 including an inspection of the data portion of a packet (and possibly also the header of a packet). In an exemplary embodiment, traffic information relating to each wireless device 302 can be determined including traffic flow profiles and congestion control mechanism modes.

In addition, inspection node 314 can also include a data flow mechanism to modify traffic flow transmissions in the communication network based on the traffic flow profile and the congestion control mechanism mode. Inspection node 314 can be for example, a standalone computing device or network element. Alternatively, the functionality of mode inspection node 314 can be included in another network element, such as a mobility management entity (MME), a gateway, a proxy node, or another network element.

Inspection node 314 can comprise a processor and associated circuitry to execute or direct the execution of computer-readable instructions. Inspection node 314 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

Communication network 318 can be any type of network or internetwork. Network 318 may comprise a computer, a network, or a collection of computers and networks that couple, link, or otherwise operatively provide wireless device 302 with communication service. It should be understood that network 318 may comprise secondary data networks. For example, network 318 may include a backhaul network, a local network, a long distance network, a packet network, or any combination thereof, as well as other types of networks. Network 318 may be or include an access service network (ASN), an access service network gateway (ASN-GW), wireless local access network access gateway (WAG), packet data gateway (PDG), mobile switching center (MSC) and packet data serving node (PDSN).

In operation, an element of communication system 300 can monitor messages transmitted in the system to determine a lifetime classification for each traffic flow message. The lifetime classifications can comprise short-lived or long-lived. For example, access node 306, controller node 310, and/or inspection node 314 can monitor traffic flow messages and determine a lifetime classification for each traffic flow message. A data flow mechanism, such as a token bucket algorithm, can be used to modify the traffic flow transmission in communication system 300. For example, a variable, such as a token bucket size, can be set based on the traffic flow message lifetime classification and congestion control mechanism mode of each message. Priority transmission can be given to short-lived messages over long-lived messages to allow short lived messages to be delivered faster thereby releasing radio bearers promptly and minimizing any delay perceived by a user.

Figure 4:
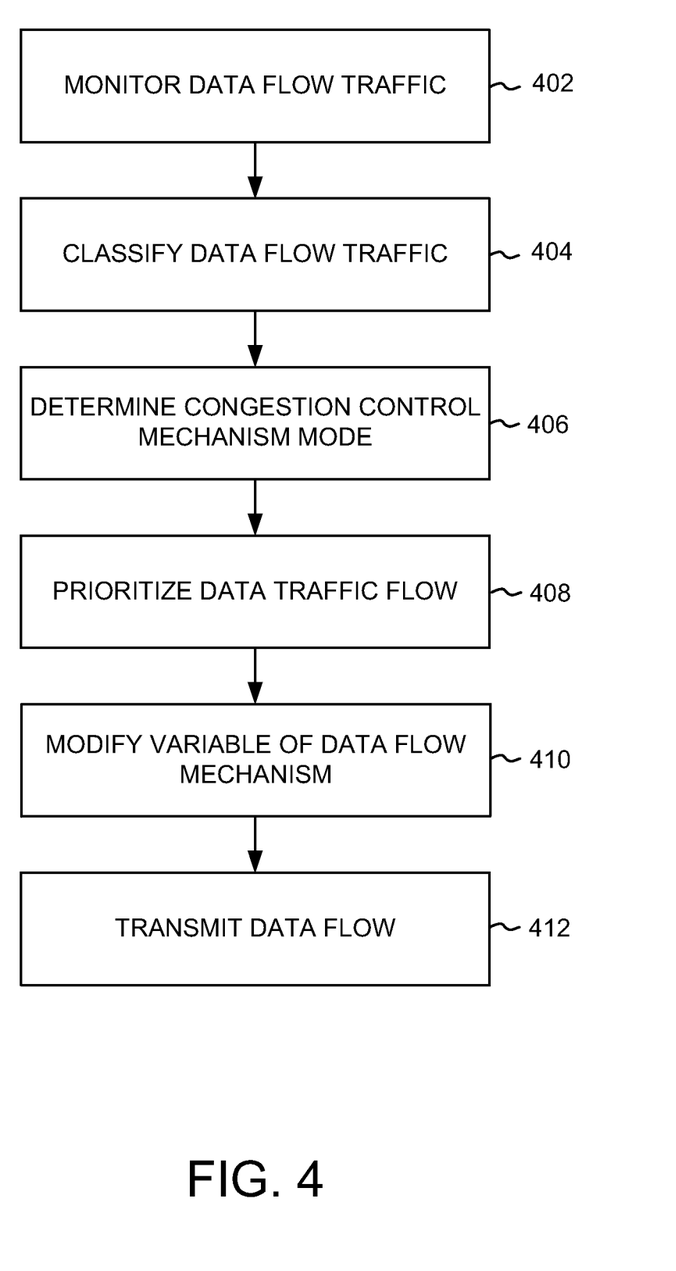
FIG. 4 illustrates another exemplary method of transmitting traffic flows in a communication network.

FIG. 4 illustrates an exemplary method of managing traffic flow in a communication network. The method will be discussed with reference to the exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A network node can monitor data flow traffic transmitted over the communication system 300 at 402. For example, access node 306, controller node 310, and/or inspection node 314 can monitor TCP message flows between the network and wireless device 302 in the uplink and/or downlink direction. At 404, a traffic flow message can be classified based on a lifetime classification type. For example, a message can be classified as a short-lived message or a long-lived message. Classification determination can be performed by the access node 306, controller node 310, and/or inspection node 314.

A congestion control mechanism can be monitored to determine a congestion control mechanism mode at 406. For example, access node 306, controller node 310, and/or inspection node 314 can monitor a congestion window to determine whether the congestion window is in a slow-start mode, a congestion avoidance mode, and/or a constant-rate mode.

Traffic flow messages can be prioritized based on the lifetime classification at 408. For example, access node 306, controller node 310, and/or inspection node 314 can prioritize messages such that short-lived messages are given higher transmission priority than long-lived messages.

A variable of a data flow mechanism can be modified based on the lifetime classification of each message and the congestion control mechanism mode at 410. For example, a variable, such as token bucket size, of a token bucket algorithm can be modified by access node 306, controller node 310, and/or inspection node 314 based on whether the message is classified as a short-lived message or a long lived message in addition to the congestion control mechanism mode determined for each message. At 412, data flow can be transmitted in the network. For example, messages can be transmitted to and/or from wireless device 302 using the data flow mechanism.

Figure 5:
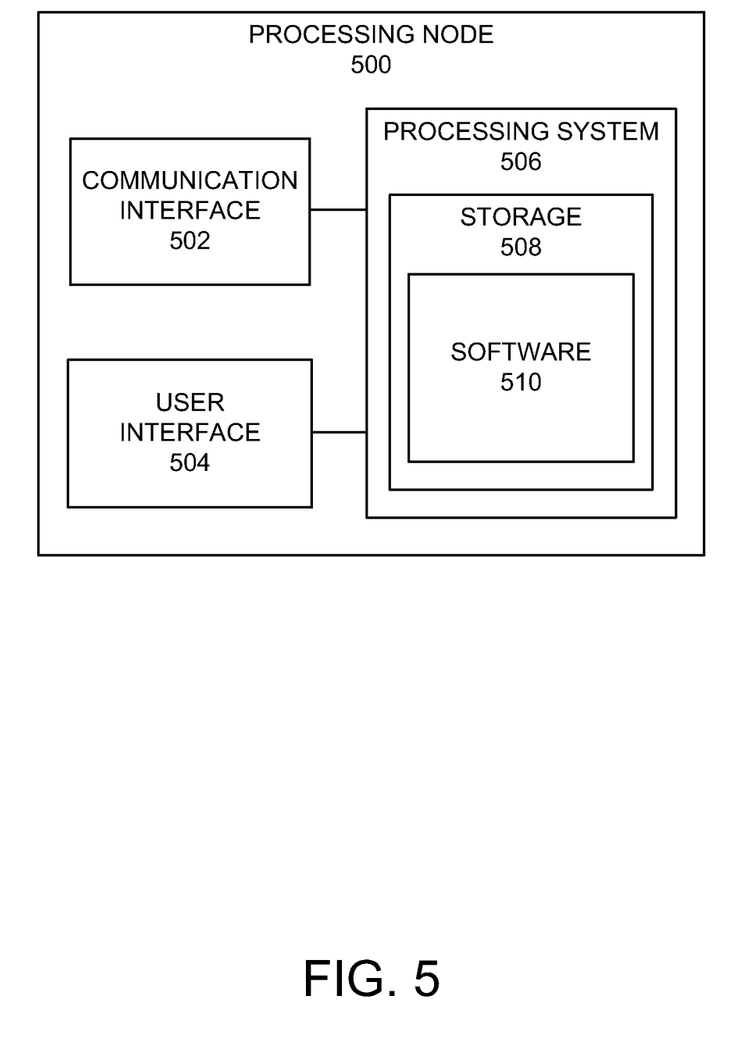
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 is capable of monitoring communications in a communication network. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 104, 306, controller nodes 106, 310, and inspection node 314. Processing node 500 can also be an adjunct or component of a network element, such as an element of access nodes 104, 306, controller nodes 106, 310, and inspection node 314. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing traffic flow in a communication network, comprising:
   monitoring a plurality of message flows transmitted at an access node to a wireless device;
   determining a traffic flow profile for each of the plurality of transmitted message flows at an inspection node, wherein the traffic flow profile is based on a lifetime classification type of the transmitted message flow;
   associating a congestion control mechanism mode with the lifetime classification type of at least one of the plurality of transmitted message flows, wherein the associated congestion control mechanism mode is one of a slow-start mode, a congestion avoidance mode, a constant-rate mode, or any combination thereof;
   modifying a rate of message flow transmissions in the communication network using a data flow mechanism, wherein a variable of the data flow mechanism is modified based on the determined lifetime classification type of each of the plurality of transmitted message flows and the associated congestion control mechanism mode; and
   prioritizing message flow transmissions at the access node for delivery to the wireless device based on a lifetime classification type of short-lived or long-lived, wherein message flow transmissions classified as short-lived are given over-the-air traffic flow priority over message flow transmissions classified as long-lived.

2. The method as in claim 1, wherein determining the traffic flow profile for each of the plurality of transmitted message flows comprises determining whether each transmitted message flow is a short-lived message or a long-lived message.

3. The method as in claim 2, wherein the data flow mechanism variable is configured to modify the rate at which data is transmitted in the communication network and is modified such that packets are sent less frequently when the message flow is classified as the long-lived message.

4. The method as in claim 2, wherein the data flow mechanism variable is configured to modify the rate at which data is transmitted in the communication network and is modified such that packets are sent more frequently when the message flow is classified as the short-lived message.

5. The method as in claim 1, wherein the data flow mechanism is a token bucket algorithm.

6. The method as in claim 5, wherein the data flow mechanism variable comprises at least one of a token generation rate, a token size, a bucket size, and a packet generation rate.

7. The method as in claim 1, wherein classifying the message flows based on a lifetime classification type of each message flow is performed by a deep packet inspection (DPI) device.

8. A method of managing traffic flow in a communication network, comprising:
   monitoring a plurality of message flows transmitted in a down link traffic flow of the communication network;
   classifying each of the plurality of message flows based on a lifetime of each message, wherein the messages are classified as a short-lived message or a long-lived message;
   associating congestion control mechanism mode with each lifetime classification by monitoring a congestion window to determine whether the congestion window is in a slow-start mode, a congestion avoidance mode, a constant-rate mode, or a combination thereof;
   modifying message flow transmission in the communication network using a data flow mechanism, wherein a variable of the data flow mechanism is modified based on the lifetime classification of each message flow and the associated congestion control mechanism mode; and
   prioritizing over-the-air message flow transmissions based on the lifetime classification associated with each of the plurality of message flows.

9. The method as in claim 8, wherein short-lived messages are given message flow transmission priority over long-lived messages.

10. The method as in claim 8, wherein the data flow mechanism variable for short-lived message is modified such that packets are sent more frequently and the data flow mechanism variable for long-lived messages is modified such that packets are sent less frequently.

11. The method as in claim 8, wherein the data flow mechanism is a token budget algorithm.

12. The method as in claim 11, wherein the data flow mechanism variable comprises at least one of a token generation rate, a token size, a bucket size, and a packet generation rate.

13. The method as in claim 8, wherein classifying the messages based on a lifetime of each message is performed by a deep packet inspection (DPI) device.

14. A communication system comprising:
   a processing node configured to:
      monitor a plurality of message flows transmitted at an access node to a wireless device in the communication system;
      determine a traffic flow profile for each of the plurality of transmitted message flows based on a lifetime classification type of the transmitted message flow;
      associate a congestion control mechanism mode with each traffic flow profile by monitoring a congestion window to determine whether the congestion window is in a slow-start mode, a congestion avoidance mode, a constant-rate mode, or a combination thereof; and modify message flow transmissions in the communication network using a data flow mechanism, wherein a data flow mechanism variable is modified based on the determined traffic flow profile of each of the plurality of transmitted message flows and the associated congestion control mechanism mode; and prioritize message flow transmissions at the access node for delivery to the wireless device based on a lifetime classification type of short-lived or long-lived, wherein the message flow transmissions classified as short-lived are given over-the-air traffic flow priority over message flow transmissions classified as long-lived.

15. The communication system as in claim 14, wherein the processing node is further configured to modify message transmissions in the communication network using the data flow mechanism for each lifetime classification type.

16. The communication system as in claim 14, wherein the processing node is further configured to prioritize message transmissions such that short-lived messages are given priority over long-lived messages.

17. The communication system as in claim 14, wherein the data flow mechanism variable is modified such that packets are sent less frequently when the message is classified as a long-lived message and the token bucket criteria is modified such that packets are sent more frequently when the message is classified as the short-lived message.

18. The communication system as in claim 14, wherein the data flow mechanism variable comprises at least one of a token generation rate, a token size, a bucket size, and a packet generation rate.

19. The communication system as in claim 14, wherein the processing node is a deep packet inspection (DPI) device.

* * * * *